United States Patent [19]
Holloway

[11] 3,738,701
[45] June 12, 1973

[54] VELOCIPEDE EQUIPPED WITH DUMP BODY

[76] Inventor: Joseph Marion Holloway, 311 W. 9th St., Sedalia, Mo. 65301

[22] Filed: July 2, 1971

[21] Appl. No.: 159,422

[52] U.S. Cl. ............................... 298/19 R, 46/214
[51] Int. Cl. .......................... B60p 1/12, B60p 1/28
[58] Field of Search .................. 298/19 R, 2, 19 V, 298/3, 17 R, 5; 46/40, 46, 214; 273/201; 74/96

[56] References Cited
UNITED STATES PATENTS

| | | | |
|---|---|---|---|
| 1,838,224 | 12/1931 | Holloway | 298/19 R |
| 1,931,841 | 10/1933 | Evans | 273/201 |
| 2,563,974 | 8/1951 | Thierry | 46/40 |

*Primary Examiner*—Richard J. Johnson
*Assistant Examiner*—Reinhard Eisenzopf
*Attorney*—Kimmel, Crowell & Weaver

[57] ABSTRACT

A tricycle is provided with a depressed rear frame portion for the support of a pivoted dumping body including a tailgate. A simplified manual linkage on the tricycle frame in ready reach of the rider enables the dump body and tailgate to be operated by the rider while on the seat of the tricycle or velocipede.

4 Claims, 4 Drawing Figures

PATENTED JUN 12 1973 3,738,701

INVENTOR
JOSEPH M. HOLLOWAY
BY

Kimmel, Crowell & Weaver
ATTORNEYS

VELOCIPEDE EQUIPPED WITH DUMP BODY

The objective of this invention is to improve upon and simplify the structure disclosed in prior U. S. Pat. No. 1,838,224 to Halloway, issued Dec. 29, 1931. In accordance with the present invention, the dump body manipulating linkage is rendered more simplified and economical in construction and also more positive and convenient in operation. In general, the purpose of the velocipede and its usage is the same as explained in said prior patent.

BRIEF DESCRIPTION OF DRAWING FIGURES

DETAILED DESCRIPTION

Figure 1:
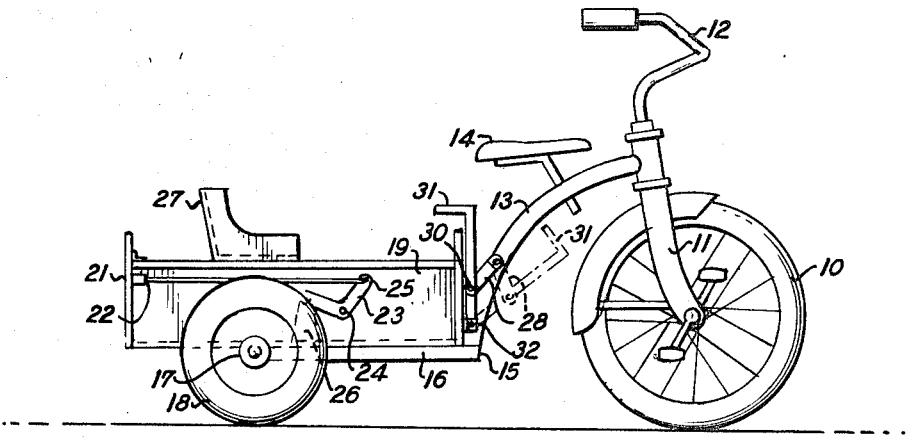
FIG. 1 is a side elevation of a velocipede having a dump body and dump body operating means in accordance with the invention.

Referring to the drawings in detail wherein like numerals designate like parts, a tricycle velocipede includes a front steering and propelling wheel 10 journaled on the usual steering fork 11 having handle bars 12. A curved downwardly extending frame bar 13 extending rearwardly from the fork 11 carries the rider's seat 14 and is joined rigidly at its lower end to the transverse horizontal cross bar 15 of a rearwardly extending U-shaped level frame 16 having a relatively low elevation, as shown. The rear ends of the sides of the U-shaped frame 16 are secured to and supported by a rear transverse axle 17 upon which the two rear wheels 18 of the velocipede are mounted in a conventional manner.

Disposed above the level U-shaped frame 16 is a dump box or body 19 having suitable bearings 20 on its bottom enabling the dump body to pivot on the axis of the transverse axle 17 as it is raised and lowered by a linkage, to be described. The dump body has a tailgate 21 pivoted to its top rear. The tailgate 21 is pivotally connected, below its pivotal connection to the dump body, to a rod 22 extending close to one side of the dump body. A bell crank 23 is pivoted to the side of the dump body at 24 and one of its arms is pivotally connected to the rod 22 at 25. The other arm of the bell crank is pivoted to a fixed upstanding bracket 26 on one side of the frame 16. This mechanism causes the tailgate 21 to swing open automatically as the dump body 19 is raised or tilted and to close automatically when the dump body is returned to its level position.

Optionally, the dump body 19 may be equipped with a rider's seat 27 suitably detachably secured thereto above the rear wheels 18 approximately.

Figure 2:
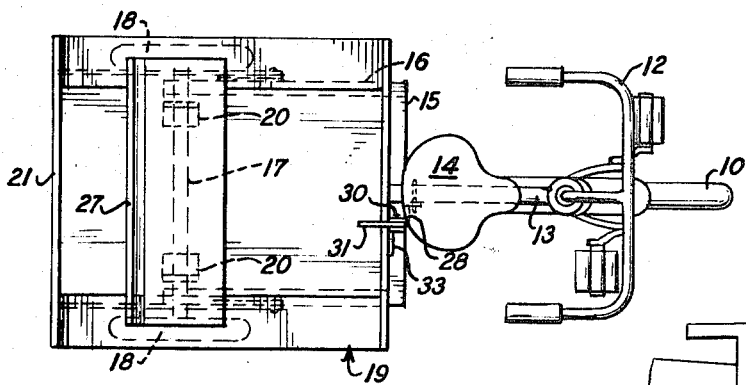
FIG. 2 is a plan view of the structure shown in FIG. 1.

The mechanism or linkage for operating the dump body 19 is essentially an over-dead-center manual linkage and comprises a short vertically swingable link 28 having its upper end pivotally secured at 29 to one side of the frame bar 13 intermediate the ends of the frame bar. As shown best in FIG. 2, the short link 28 is formed with a lateral offset so that the main operating lever, to be described, will clear the front wheel fender. The other end of the short link 28 is pivotally connected at 30 to a main elongated dump body operating lever or handle 31 which also swings in a vertical plane and has its lower end pivotally connected at 32 to a rigid L-bracket 33 on the front of dump body 19 near the bottom thereof and spaced somewhat from the center line of the vehicle, FIG. 2. The bottom pivot 32 for lever 31 is spaced considerably below the pivots 29 and 30 and the short link 28.

Figure 3:
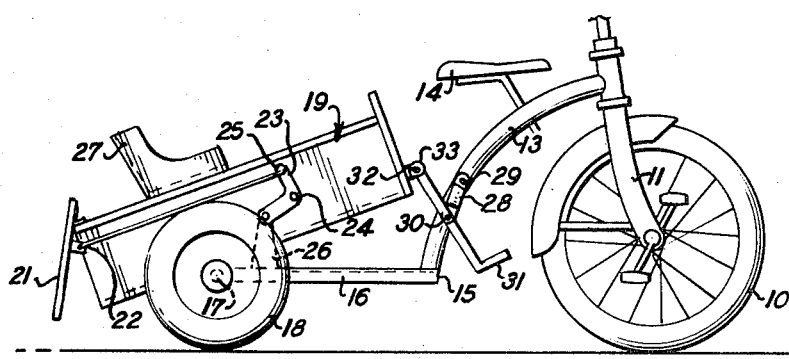
FIG. 3 is a side elevation of the velocipede with the dump body in the elevated dumping position.
Figure 4:
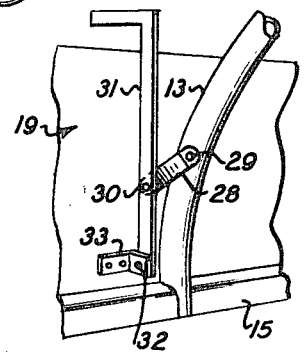
FIG. 4 is a fragmentary enlarged perspective view of the dump body operating linkage.

To operate the pivoted dump body, the rider on the seat 14 grasps the upright handle or lever 31 and swings the same forwardly and downwardly upon the pivot 32 which is initially vertically below the pivot 30, FIGS. 1 and 4. The short link 28 and lever 31 will travel to intermediate positions such as shown in FIG. 1 in broken lines with lost motion and to unlock the dump body by moving the linkage from the dead-center condition shown in full lines in FIG. 1. As the downward movement of the lever 31 continues toward its full down position in FIG. 3, the short link 28 will begin to swing in the opposite direction on its suspension pivot 29 and will reach the position approximately as shown in FIG. 3. At this time, the lever 31 will have been moved almost 180° from its original dead-center position in FIG. 1 and the dump body 19 is elevated to the dumping position with the tailgate open. Release of the lever 31 will allow the dump body to return by gravity to its normal level position where it is locked by the over-dead-center arrangement of the pivots 32 and 30 and will not tilt again until the lever 31 is pushed forwardly. The mechanism for operating the dump body is extremely simplified, compact, sturdy and very economical to manufacture and easy to operate.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A velocipede comprising a tricycle body portion including a level rear frame extension, a dump body pivotally mounted at its rear on said frame extension for movement between a normal level position and an upwardly tilted dumping position, and a manual linkage for operating the dump body comprising, when the dump body is in said level position, a single short link having a lateral offset therein and having an upper end connected by a first pivotal connection with a frame part of the tricycle body portion for forward-rearward movement so as to extend downwardly and rearwardly of said first pivotal connection, and an elongated substantially straight and vertically extending operating lever, that is longer than said link, connected by a second pivotal connection intermediate its ends for forward-rearward movement to the lower end of said short link and having its lower end below said second pivotal connection connected by a third pivotal connection for forward-rearward movement to the forward end of the dump body, whereby said lever when the dump body is in said level position causes the dump body to be locked in the level position and a downward and forward movement of the lever about said third pivotal connection causes the link to first swing forwardly and then swing rearwardly about said first pivotal connection until the lever extends forwardly and downwardly of said third pivotal connection and the link extends downwardly and rearwardly of said first pivotal connection with the dump body in said tilted position.

2. The structure of claim 1, and a bracket on the forward end of the dump body near its bottom and said lower end of the lever pivoted to the dump body through said bracket to form said third pivotal connection, said bracket and lever being spaced laterally from the center line of the velocipede.

3. The structure of claim 1, and a pivoted tailgate on said dump body, and an operating linkage for the tailgate including parts connected with the tailgate, dump body and said frame extension, whereby the tailgate will open and close automatically as the dump body is raised and lowered.

4. The structure of claim 1 and said first pivotal connection connected with a curved seat supporting frame bar of the velocipede between the front and rear wheels thereof and substantially below the seat of the velocipede, said operating lever when the dump body is in said level position having an upper handle extension disposed close to the rear of the seat and immediately therebelow.

* * * * *